(No Model.)

J. A. SAUNDERS.
NUT LOCK.

No. 376,347. Patented Jan. 10, 1888.

Witnesses:
W. W. Mortimer
H. F. Riley

Inventor:
John A. Saunders,
by R. S. Dyrenforth,
his Attorney.

UNITED STATES PATENT OFFICE.

JOHN A. SAUNDERS, OF WARRENTON, VIRGINIA.

NUT-LOCK.

SPECIFICATION forming part of Letters Patent No. 376,347, dated January 10, 1888.

Application filed May 5, 1887. Serial No. 237,250. (No model.)

*To all whom it may concern:*

Be it known that I, JOHN A. SAUNDERS, a citizen of the United States, residing at Warrenton, in the county of Fauquier and State of Virginia, have invented certain new and useful Improvements in Nut-Locks; and I do hereby declare the following to be a full, clear, and exact description of the invention, such as will enable others skilled in the art to which it appertains, to make and use the same.

The invention relates to nut-locks; and it consists in the construction and novel combination of parts, as hereinafter set forth.

Figure 1:
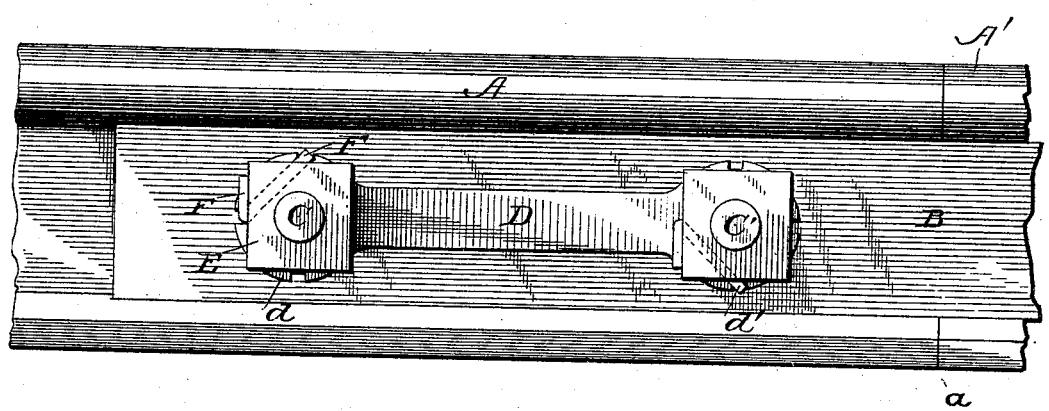
Figure 2:
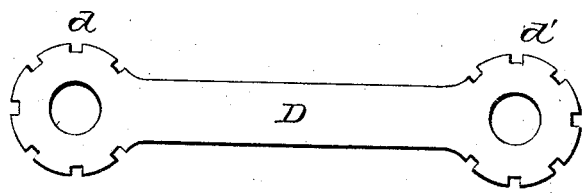
Figure 3:
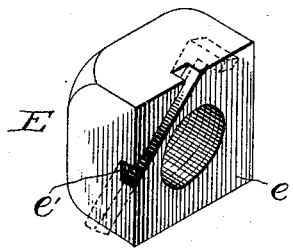

In the accompanying drawings, forming part of this specification, and in which like letters of reference indicate corresponding parts, Figure 1 represents a side elevation of my invention with the nuts secured in place, showing the heads of the keys taking into the notches in the washers. Fig. 2 is a side elevation of my combined base-plate and washers with the nuts removed, and Fig. 3 is a detail view of the under surface of the nut with a groove running obliquely through the corner thereof.

In the drawings, A and A' designate ordinary T-rails, which form a joint at *a*. Fish-plates B are secured upon both sides of the joint by bolts C and C', which are screw-threaded at one end. At their screw-threaded ends these bolts protrude through washers *d* and *d'* of the base-plate D. One of these base-plates D is upon each side lengthwise of the joint, as shown, and the combined base-plate and washers, being of one piece of metal, great strength and durability is given to the bolts.

The under surface, *e*, of the nut E is grooved obliquely for the reception of a key, F, when the nut is screwed down tightly to the seat. The key F has an angularly-bent end in one direction only, (as shown,) for the purpose of taking into one of the notches when the key is pushed into the groove *e'* its entire length. The key is pushed into the groove in the same direction in which the nut turns when being screwed down to the base-plate, in order that when an attempt is made to turn the nut in the opposite direction it will remain stationary. In order to secure the nut against movement from any cause the key is bent back against the side of the nut, as shown, or otherwise.

It will be apparent that the efficiency of my invention may be farther increased, if necessary, by providing the base-plates with a greater number of washers, whereby more bolts may be employed and the joint strengthened.

It will further be obvious that the application of my invention upon any railroad will not necessitate change in the construction of any portion of the rail, and that an ordinary fish-plate may be employed.

The key used by me to confine the nut in place is preferably made of tough flexible substance, in order that it may not break off at the bend and drop out of the groove.

One of the special advantages of my device is the facility and speed with which the device may be placed in position and the nut locked, one blow of the hammer sufficing to bend a nail for the key back against the nut.

Having thus fully described my invention, what I claim as new, and desire to secure by Letters Patent, is—

The herein-described device for locking nuts on bolts, consisting of a flat bar having serrated, notched, or toothed washers formed on its ends, said washers having bolt-openings, in combination with nuts provided with inclined passages or grooves on their under faces at the corners thereof adapted to be screwed on the bolts until they rest on the serrated washers, and keys or wedges adapted to be inserted in the grooves of the nuts and have one end engaging a notch on the washers and the other end bent in against the nut, for the purpose set forth, substantially as described.

In testimony whereof I affix my signature in presence of two witnesses.

JNO. A. SAUNDERS.

Witnesses:
R. G. DYRENFORTH,
W. W. MORTIMER.